US012695530B2

(12) United States Patent
Taylor et al.

(10) Patent No.: US 12,695,530 B2
(45) Date of Patent: Jul. 28, 2026

(54) SYSTEMS AND METHODS OF TIME SYNCHRONIZATION

(71) Applicant: Apple Inc., Cupertino, CA (US)

(72) Inventors: Haley A Taylor, Golden, CO (US);
Daniel E Loffgren, Campbell, CA
(US); Glenn D Henshaw, Sunnyvale,
CA (US); Kevin M Duffy, San Jose,
CA (US); Sean L Carstensen, San
Jose, CA (US)

(73) Assignee: Apple Inc., Cupertino, CA (US)

( * ) Notice: Subject to any disclaimer, the term of this
patent is extended or adjusted under 35
U.S.C. 154(b) by 394 days.

(21) Appl. No.: 18/366,134

(22) Filed: Aug. 7, 2023

(65) Prior Publication Data

US 2024/0396655 A1     Nov. 28, 2024

Related U.S. Application Data

(60) Provisional application No. 63/504,092, filed on May
24, 2023.

(51) Int. Cl.
H04J 3/06          (2006.01)
(52) U.S. Cl.
CPC ................................. H04J 3/0667 (2013.01)
(58) Field of Classification Search
CPC ...... H04J 3/0667; H04J 3/0673; H04J 3/0638;
H04J 3/0661; H04W 56/001; H04W
56/0015; H04W 56/002; H04L 7/0012;
H04L 7/0016
See application file for complete search history.

(56) References Cited

U.S. PATENT DOCUMENTS

| | | | | |
|---|---|---|---|---|
| 6,157,957 | A | * 12/2000 | Berthaud | .................. G06F 1/14 |
| | | | | 709/248 |
| 8,954,609 | B1 * | 2/2015 | Holleman | ............. H04J 3/0667 |
| | | | | 709/227 |
| 2015/0172843 | A1 * | 6/2015 | Quan | ...................... G06F 3/162 |
| | | | | 381/17 |
| 2017/0359162 | A1 * | 12/2017 | Granqvist | ............... H04W 4/80 |

(Continued)

OTHER PUBLICATIONS

Milss et al, "An IP.com Prior Art Database Technical Disclosure",
Network Working Group, 1985 (Year: 1985).*

(Continued)

*Primary Examiner* — Omer S Mian
(74) *Attorney, Agent, or Firm* — FLETCHER YODER PC

(57)          ABSTRACT

An electronic device can receive power from a powered
accessory and can include a first communication system that
communicates with the powered accessory; an internal
clock; and a first processing system. Upon connection of the
electronic device to the powered accessory, the first pro-
cessing system can send a time update request to the
powered accessory and can update the internal clock based
on a time update received from the powered accessory. The
powered accessory can include an energy storage device that
delivers power to the electronic device; a second commu-
nication system that communicates with the electronic
device; a real time clock; and a second processing system.
Upon connection of the electronic device to the powered
accessory and receiving the time update request from the
electronic device the processing system can send the time
update to the electronic device.

17 Claims, 4 Drawing Sheets

(56) References Cited

U.S. PATENT DOCUMENTS

2019/0146110 A1* 5/2019 Hovland .................. G01V 1/18
                                                367/50
2020/0220387 A1* 7/2020 Zeine ...................... H02J 50/90

OTHER PUBLICATIONS

Jie, et al, "Research on network timing system based on NTP", ICEMI, 2017 (Year: 2017).*

* cited by examiner

SYSTEMS AND METHODS OF TIME SYNCHRONIZATION

CROSS-REFERENCE TO RELATED APPLICATIONS

This application claims priority to and the benefit of U.S. Provisional Application No. 63/504,092, entitled "Systems and Methods of Time Synchronization," filed May 24, 2023, which is hereby incorporated by reference in its entirety for all purposes.

BACKGROUND

Electronic devices may use power sources, such as batteries, that can become detached from the device or can otherwise become unavailable because of substantially complete discharge or other reasons. Such a detachment or unavailability event can lead to a reset/reboot of the electronic device that can also lead to loss of accurate time information. However, accurate time information is useful, and in some cases might even be required for certain tasks performed by the electronic device.

SUMMARY

For such applications, it may be desirable to provide an electronic device and associated systems and methods that can allow the device to quickly derive accurate time information upon reconnection or other restoration of a power source.

An electronic device can include power regulation circuitry that receives power from a powered accessory; a first communication system that communicates with the powered accessory; an internal clock; and a first processing system coupled to the first communication system and the internal clock. Upon connection of the electronic device to the powered accessory, the first processing system can send a first time update request to the powered accessory and can update the internal clock based on a first time update received from the powered accessory. The powered accessory can include an energy storage device that delivers power to the electronic device; a second communication system that communicates with the electronic device; a real time clock; and a second processing system coupled to the second communication system and the real time clock. Upon connection of the electronic device to the powered accessory and receiving the first time update request from the electronic device the processing system can send the first time update to the electronic device. The first time update request and first time update can take the form of a network time protocol packet. The first time update can take the form of a network time protocol packet.

The electronic device can further include a network interface coupled to the first processing system. The first processing system can send a second time update request to a network time protocol server via the network interface according to a network time protocol and can receive a second time update from the network time protocol server via the network interface according to the network time protocol. The first processing system can send a third time update to the powered accessory via the first communication system. The third time update can be based on the second time update received from the network time protocol server. The second processing system can update the real time clock based on the third time update.

An electronic device can include power regulation circuitry that receives power from a powered accessory; a first communication system that communicates with the powered accessory; an internal clock; and a first processing system coupled to the first communication system and the internal clock. Upon connection of the electronic device to the powered accessory, the first processing system can send a first time update request to the powered accessory and update the internal clock based on a first time update received from the powered accessory. The first time update request and first time update can take the form of a network time protocol packet. The first time update request and first time update can not correspond to a network time protocol. The first time update can include information about present time, communication delay between the electronic device and the powered accessory, and a powered accessory clock uncertainty value. The first processing system can not update the internal clock if the powered accessory clock uncertainty value exceeds a threshold. Prior to sending the first time update request to the powered accessory, the first processing system can update the internal clock using an internally recovered time. The internally recovered time can be based on a file system timestamp associated with the first processing system.

The electronic device can further include a network interface coupled to the first processing system. The first processing system can send second time update request to a network time protocol server via the network interface according to a network time protocol; receive a second time update from the network time protocol server via the network interface according to the network time protocol; and update the internal clock based on the second time update. The first processing system can send a third time update to the powered accessory via the first communication system, and the third time update can be based on the second time update received from the network time protocol server.

A powered accessory that supplies power an electronic device can include an energy storage device that delivers power to the electronic device; a communication system that communicates with the electronic device; a real time clock; and a processing system coupled to the communication system and the real time clock. Upon connection of the electronic device to the powered accessory and receiving a first time update request from the electronic device the processing system can send a first time update to the electronic device. The first time update request and first time update take the form of a network time protocol packet. The first time update request and first time update can not correspond to a network time protocol. The first time update can include information about present time, communication delay between the electronic device and the powered accessory, and a powered accessory real time clock uncertainty value. The processing system can receive a second time update via the communication system from the electronic device; and the processing system updates the real time clock based on the second time update. The processing system can detect a reset that might affect the real time clock and in response thereto can set an uncertainty value associated with the real time clock to a maximum value.

DETAILED DESCRIPTION

Figure 1:
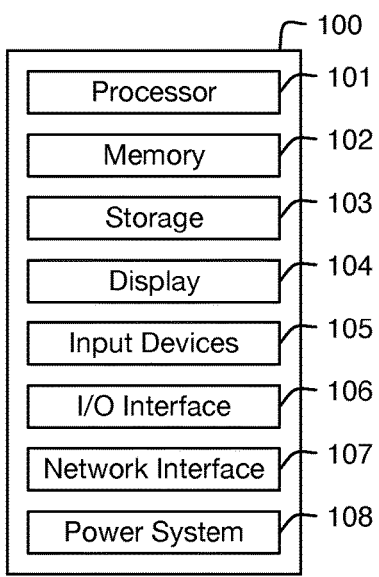
FIG. 1 illustrates a block diagram of an electronic device.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth to provide a thorough understanding of the implementations described herein. In other instances, methods, procedures, and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 is a block diagram of an electronic device 100, according to embodiments of the present disclosure. The electronic device 100 may include, among other things, one or more processors 101 (collectively referred to herein as a single processor for convenience, which may be implemented in any suitable form of processing circuitry), memory 102, nonvolatile storage 103, a display 104, input devices 105, an input/output (I/O) interface 106, a network interface 107, and a power system 108. The various functional blocks shown in FIG. 1 may include hardware elements (including circuitry), software elements (including machine-executable instructions), or a combination of both hardware and software elements (which may be referred to as logic). The processor 101, memory 102, the nonvolatile storage 103, the display 104, the input devices 105, the input/output (I/O) interface 106, the network interface 107, and/or the power system 108 may each be communicatively coupled directly or indirectly (e.g., through or via another component, a communication bus, a network, etc.) to one another to transmit and/or receive data amongst one another. It should be noted that FIG. 1 is merely one example of a particular implementation and is intended to illustrate the types of components that may be present in the electronic device 100.

By way of example, the electronic device 100 may include any suitable computing device, including a desktop or laptop/notebook computer, a portable electronic or handheld electronic device such as a wireless electronic device or smartphone, a tablet computer, a wearable electronic device, and other similar devices.

Processor 101 and other related items in FIG. 1 may be embodied wholly hardware or by hardware programmed to execute suitable software instructions. Furthermore, the processor 101 and other related items in FIG. 1 may be a single contained processing module or may be incorporated wholly or partially within any of the other elements within the electronic device 100. Processor 101 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. Processor 101 may include one or more application processors, one or more baseband processors, or both, and perform the various functions described herein.

In the electronic device 100 of FIG. 1, processor 101 may be operably coupled with a memory 102 and a nonvolatile storage 103 to perform various algorithms. Such programs or instructions executed by processor 101 may be stored in any suitable article of manufacture that includes one or more tangible, computer-readable media. The tangible, computer-readable media may include the memory 102 and/or the nonvolatile storage 103, individually or collectively, to store the instructions or routines. The memory 102 and the nonvolatile storage 103 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by processor 101 to enable the electronic device 100 to provide various functionalities.

In certain embodiments, the display 104 may facilitate users to view images generated on the electronic device 100. In some embodiments, the display 104 may include a touch screen, which may facilitate user interaction with a user interface of the electronic device 100. Furthermore, it should be appreciated that, in some embodiments, the display 104 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input devices 105 of the electronic device 100 may enable a user to interact with the electronic device 100 (e.g., pressing a button to increase or decrease a volume level). The I/O interface 106 may enable electronic device 100 to interface with various other electronic devices, as may the network interface 107. In some embodiments, the I/O interface 106 may include an I/O port for a hardwired connection for charging and/or content manipulation using a standard connector and protocol, such as the universal serial bus (USB), or other connector and protocol. The network interface 107 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a $6^{th}$ generation (6G) or greater than 6G cellular network, a satellite network, a non-terrestrial network, and so on. In particular, the network interface 107 may include, for example, one or more interfaces for using a cellular communication standard of the 5G specifications that include the millimeter wave (mmWave) frequency range (e.g., 24.25-300 gigahertz (GHz)) that defines and/or enables frequency ranges used for wireless communication. The network interface 107 of the electronic device 100 may allow communication over the aforementioned networks (e.g., 5G, Wi-Fi, LTE-LAA, and so forth).

The network interface 107 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

The power system 108 of the electronic device 100 may include any suitable source of power, such as a rechargeable battery (e.g., a lithium ion or lithium polymer (Li-poly) battery) and/or a power converter, including a DC/DC power converter, an AC/DC power converter, a power adapter (which may be external), etc.

Figure 2:
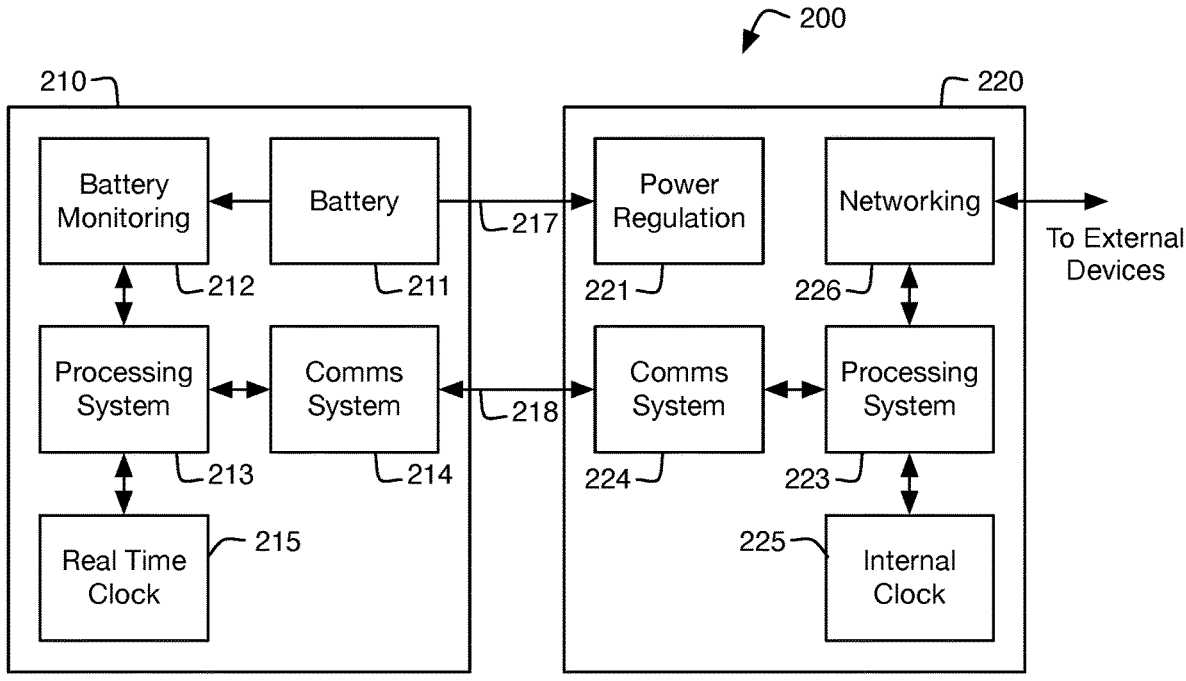
FIG. 2 illustrates a system including an electronic device and an associated powered accessory that can facilitate deriving accurate time information upon reconnection or other restoration of a power source.

FIG. 2 illustrates a system 200 including an electronic device 220 and an associated powered accessory 210 that can facilitate deriving accurate time information upon reconnection or other restoration of a power source. Electronic device 220 may broadly correspond to device 100 discussed above with respect to FIG. 1, including one or more of the enumerated systems therein or even additional subsystems not discussed above. Electronic device 220 can be a personal/portable electronic device, such as a personal or portable computer, tablet computer, smartphone, wearable device, etc. Elements of electronic device 220 will be discussed in greater detail below.

Electronic device 220 can receive power from a powered accessory 210. Powered accessory 210 can be a battery pack with additional subsystems as described in greater detail below. In some embodiments, powered accessory 210 can be an even more sophisticated device, potentially including one or more subsystems as described above with respect to FIG. 1 and electronic device 100. Thus, powered accessory 210 could, in some embodiments be a personal/portable electronic device in its own right, such as companion computing device or accessory, etc. For purposes of the following description, all such devices will be referred to as "powered accessory" whether such devices have capabilities ranging from an external battery pack to a fully-fledged companion device that may be as capable or more capable than electronic device 220.

In one embodiment, powered accessory 210 can include a power source, for example, battery 211. Although the discussion herein refers to batteries, any suitable energy storage device could be used, including capacitor banks, supercapacitors, solar panels, or other energy storage solutions. Battery 211 can provide power to electronic device 220 via a connection 217. Connection 217 can be a galvanic electrical connection, e.g., using a suitable electrical connector, pogo pins, or other electrical terminals. In some embodiments, connection 217 could be a magnetic or electromagnetic connection, such as a wireless power transfer link using inductive power transfer, capacitive power transfer, etc. to deliver power from powered accessory 210 (and specifically battery 211) to electronic device 220. Battery 211 can also provide information to a battery monitoring system 212 that can perform one or more battery monitoring and management functions, such as state of charge monitoring, charging control, thermal monitoring, etc. Battery monitoring system 212 can be implemented using any suitable combination of analog, digital, or programmable circuitry including programmable controllers, application specific integrated circuits (ASICs), etc., and can have the required sensors and connections to battery 211 to perform the required functions and may optionally include control outputs that can drive a battery charger (not shown) to control a battery charging operation.

In some embodiments, battery monitoring system 212 can communicate with and/or be controlled by processing system 213. Processing system 213 can include a processing element (e.g., like processor 101 discussed above) as well as memory, storage, and other associated elements as was described above with respect to FIG. 1. In some embodiments, processing system can be implemented using a suitably programmed microcontroller. The number of subsystems and the power and/or complexity of processing system 213 can be determined as appropriate by the overall functionality of powered accessory 210. For a device such as a detachable battery pack, processing system 213 might be a relatively simple microcontroller with relatively simple programming. For a more sophisticated powered accessory, such as a companion computing device, processing system 213 may be more powerful, include more subsystems, and could even be implemented as a plurality of processing systems interconnected to allow data and information to be exchanged among them.

Processing system 213 can be coupled to a communication system 214 that can allow communication with other devices, e.g., communication between powered accessory 210 and electronic device 220. This communication can take place via a communication link 218. In some embodiments this could be a wired communications link, in which case one or more electrically conductive connections or wires couple communication system 214 to a corresponding communication system 224 (discussed in greater detail below). In some applications, such communication terminals or wires could be integrated into a common electrical connector and/or cable with the wires associated with power delivery from battery 211. In some applications, the communication terminals or wires could be the same terminals or wires used for power delivery, with the communication signals superimposed on the power "signal." In still other applications, communication link 218 could be a wireless communication link, employing any suitable wireless communication protocol, such as those discussed above, or any other wireless communication protocol. Communication link 218 can be a bidirectional power link, allowing two-way communication between powered accessory 210 and electronic device 220. In some embodiments, communication link could also allow direct connection with other devices (e.g., a network link) or indirect connection with other devices (e.g., via electronic device 220 and its associated networking subsystem, described in greater detail below).

Powered accessory 210 can also include a real time clock 215. Real time clock 215 can be coupled to processing system 213 such that processing system 213 can receive time information from real time clock 215 as well as allowing processing system 213 to set real time clock 215 with time information received from an external source, which could be electronic device 220 or another external device. In some cases, manual user input could also be used to provide time setting information, with such manual user input being provided by a suitable user input or I/O interface of either powered accessory 210 and/or electronic device 220. Further details of the use of real time clock 215 to either provide or receive time information are described in greater detail below.

Returning now to electronic device 220, such a device may include a power regulation system 221 that can receive power from power accessory 210 via connection 217 as described above. In some application electronic device 220 may include its own energy storage (not shown). In such cases, energy received from powered accessory 210 can be used to charge the internal energy storage of device 220. In other applications, electronic device 220 may include little or no internal storage and rely on powered accessory 210 to power its own operation. In either case, power regulation system 221 can provide any required power conversion, charging management, and power distribution to the various subsystems of electronic device 220 via power connections (not shown).

Electronic device 220 can also include a communications system 224 that can generally correspond to communications system 214 of powered accessory 210. As discussed above, this can allow communication between powered accessory 210 and electronic device 220 via communications link 218. Communications exchanged over this link can include time synchronization and recovery operations as described in greater detail below. To that end, communications system 224 can be in communication with processing system 223 of electronic device 220. Processing system 223 can include a processing element (e.g., like processor 101 discussed above) as well as memory, storage, and other associated elements as was described above with respect to FIG. 1. In some embodiments, processing system can be implemented using a suitably programmed microcontroller. The number of subsystems and the power and/or complexity of processing system 223 can be determined as appropriate by the overall functionality of electronic device 220. In at least some embodiments, processing system 223 may be a fairly powerful system, include a plurality of subsystems, and could even be implemented as a plurality of separate processing systems interconnected to allow data and information to be exchanged among them.

Processing system 223 can also be coupled to networking system 226. Networking system 226 can allow electronic device 220 to communicate with external devices, such as other computing devices (e.g., via a local area network or "LAN"), remote servers (e.g., via a wide area network or "WAN," such as the Internet), etc. To that end, networking system 226 can include a wired networking system (e.g., wired Ethernet) and/or a wireless networking system (e.g., WiFi), or any other suitable networking system or combination of networking systems. One example of such communication with external devices can be communication with remote time servers, for example time servers employing the Network Time Protocol (NTP), as described in greater detail below. Electronic device 220 may use networking system connection 226 for a wide variety of other external communication purposes as well.

Processing system 223 can also include an internal clock 225. In some applications, this internal clock 225 may be susceptible to losing power (and thus current time information) when electronic device 220 is de-powered, e.g., by removal of powered accessory 210. In other cases, the de-powering of electronic device 220 and internal clock 225 may be because of discharge or other unavailability of either an internal or external power source. In any case, it may be desired to recover accurate time as quickly as possible upon restoration of power, e.g., by reconnection of a powered accessory 210. Examples of such techniques are described in greater detail below.

The above description of system 200 including powered accessory 210 and electronic device 220 are merely exemplary and are intended to describe the various subsystems that may be used in implementing the time recovery and time setting techniques described in greater detail below. Powered accessory 210 and/or electronic device 220 may include more, fewer, or different elements and subsystems and still perform the various techniques described below. Thus, the foregoing description should be regarded as merely exemplary and should not be construed to include the omission of any of the above-described systems or subsystems, the addition of other systems or sub-systems, or reallocation of functionality between systems or subsystems as may be appropriate for a given embodiment, application, or implementation.

Figure 3:
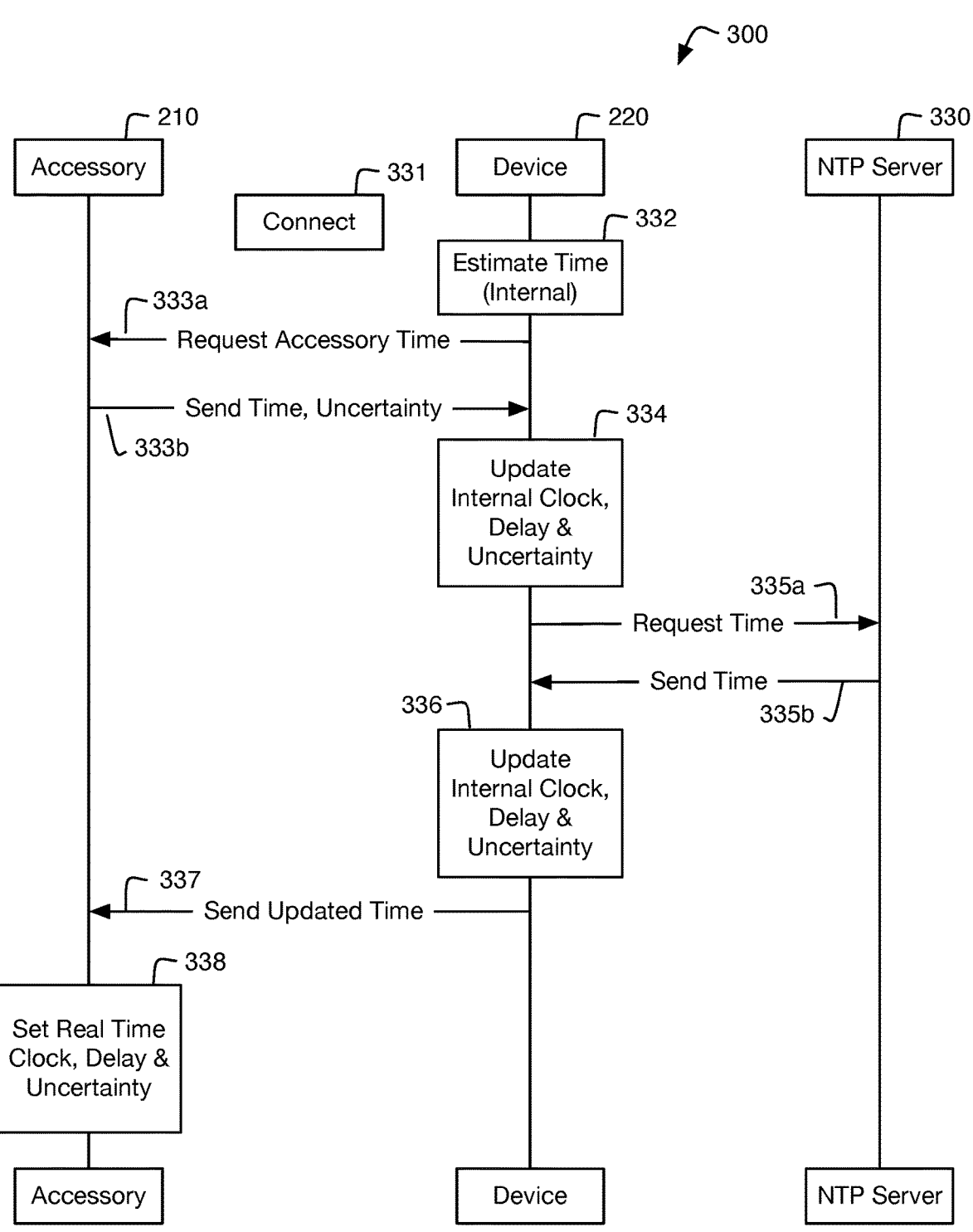
FIG. 3 illustrates a communication and computation sequence for deriving accurate time information upon reconnection or other restoration of a power source.

FIG. 3 illustrates a communication and computation sequence 300 for deriving accurate time information upon reconnection or other restoration of a power source. The communication and computation sequence can include multiple devices including powered accessory 210 and electronic device 220 discussed above. The communication and computation sequence can also include additional devices, such as a network time protocol (NTP) server 330, as discussed in greater detail below. In the diagram of FIG. 3, time proceeds from the top of the page toward the bottom. The communication and computation sequence 300 can begin with connection event 331, in which a de-powered electronic device 220 is connected to a powered accessory 210. This can trigger a "boot up" of electronic device 220. As part of this boot up process, electronic device 220 can estimate the real time for its internal clock based on internal information. For example, the clock may initiate with a defined epoch, i.e., a default date and time, such as midnight UTC on Jan. 1, 1970 (the UNIX epoch), Jan. 1, 1980 (the IBM BIOS epoch), or any other suitable date such as Jul. 1, 2021.

This default epoch may not be a suitable time estimate for any number of operations, such as date and time stamping of files, log entries, registries, databases, authentication, etc. Thus, electronic device 220 can be configured to update its clock from the default epoch by reference to internally available data. For example, electronic device 220 could be configured to check the date and time stamps associated with files stored in the device, using the latest such time stamp to reset its internal clock. This can have the effect of bringing the clock to the time close to the last time at which electronic device 220 was in operation. While this can be a better estimate than the default epoch, it still may not account for the amount of time that electronic device 220 has been out of operation (i.e., turned off) and disconnected from power.

Thus, electronic device 220 can be further programmed or configured to request a time update from powered accessory 210 via Request Accessory Time message 333*a*. As described above, powered accessory 210 can have an internal clock that can provide a still more accurate current time to electronic device 220. The format of Request Accessory Time message 333*a* can take a variety of forms. For example, the Request Accessory Time message can be in a format that is the same as or similar to the standardized network time protocol (NTP) packet. Such packets allow for the exchange of time information, including the time that a time request packet was sent by the sender, received by the recipient, along with a return packet with the time that the recipient sends a reply and an uncertainty associated with the time estimate (e.g., Send Time, Uncertainty message 333*b*).

Details of the NTP protocol are known to those skilled in the art and thus will not be repeated here. The basic concept is that a requester can look at the time it sent its request (according to its own clock and contained in the original packet), the time the request was received by the recipient (according to the recipient's clock and added to the response packet), the time that the requester received the response (according to the recipient's clock), and optionally additional uncertainty information associated with the accuracy of respective clocks (which can be added to the packet by the recipient and/or otherwise available to requester) to estimate the delay in the communication channel between requester and recipient and derive therefrom an accurate estimate of the current time based on the response received from recipient. The requester can then update its internal clock accordingly. These operations generally correspond to the NTP protocol, although a full implementation of the NTP protocol can include additional steps, details, etc. not repeated here. Moreover, the exchange between electronic device 220 and powered accessory 210 need not strictly correspond to the NTP protocol. Additionally, while the standard NTP packet format provides a convenient communication format for exchanging time information between electronic device 220 and accessory 210, other packet formats that provide for the required exchange of time information and derivation of channel delay are also contemplated.

In any case, upon connection of powered accessory 210 and electronic device 220, electronic device 220 can derive an internal time estimate and then request an updated time from powered accessory 210 via message 333*a*. Powered accessory 210 can thus provide a time update to electronic device 220 via message 333*b*. Electronic device 220 can then (block 334) update its internal clock with the time estimate and information received from powered accessory 210 via message 333*b*. For some purposes, this may be sufficient. However, in some applications it may be desirable for electronic device 220 to receive a further time update from an external source, e.g., NTP server 330. To that end, electronic device 220 may use its network interface 226 to request a time update from NTP server 330, which can be an NTP server located on the local network to which electronic device 220 is connected or on a wide area network to which electronic device 220 is connected, such as the Internet. This can include a request time message 335*a* sent from device 220 to NTP server 330 via the network interface. NTP server 330 can then send time information back to electronic device 220 via the network via message 335*b*. As NTP server may implement the standard NTP protocol, Request Time Message 335*a* and Send Time message 335*b* may be in the standard NTP packet format. Upon receiving updated time information from NTP server 330, device 220 can update (block 336) its internal clock as well as any corresponding delay and uncertainty parameters.

In some applications, the time received by electronic device 220 from NTP server 330 may be more accurate or authoritative than the time previously received from powered accessory 210. This may be because of clock drift in powered accessory 210, because powered accessory 210 previously lost power itself, or other reasons. In some cases, powered accessory 210 may not have its own network interface or other facility for receiving time updates from an NTP server or other source. For any of these reasons, it may be desirable for electronic device 220 to provide an updated time to powered accessory 210. This can be achieved by electronic device 220 sending a Send Updated Time message 337 to powered accessory 210. Send Update Time message 337 may but need not be in a format that corresponds to the NTP protocol. It may be advantageous for the Send Updated Time message 337 to include the current time as well as information that powered accessory 210 can use to derive propagation delay, time uncertainty, etc. These parameter(s) can be used (block 338) by powered accessory 210 to update its internal clock, thus allowing it to provide more accurate time estimates in the future.

Figure 4:
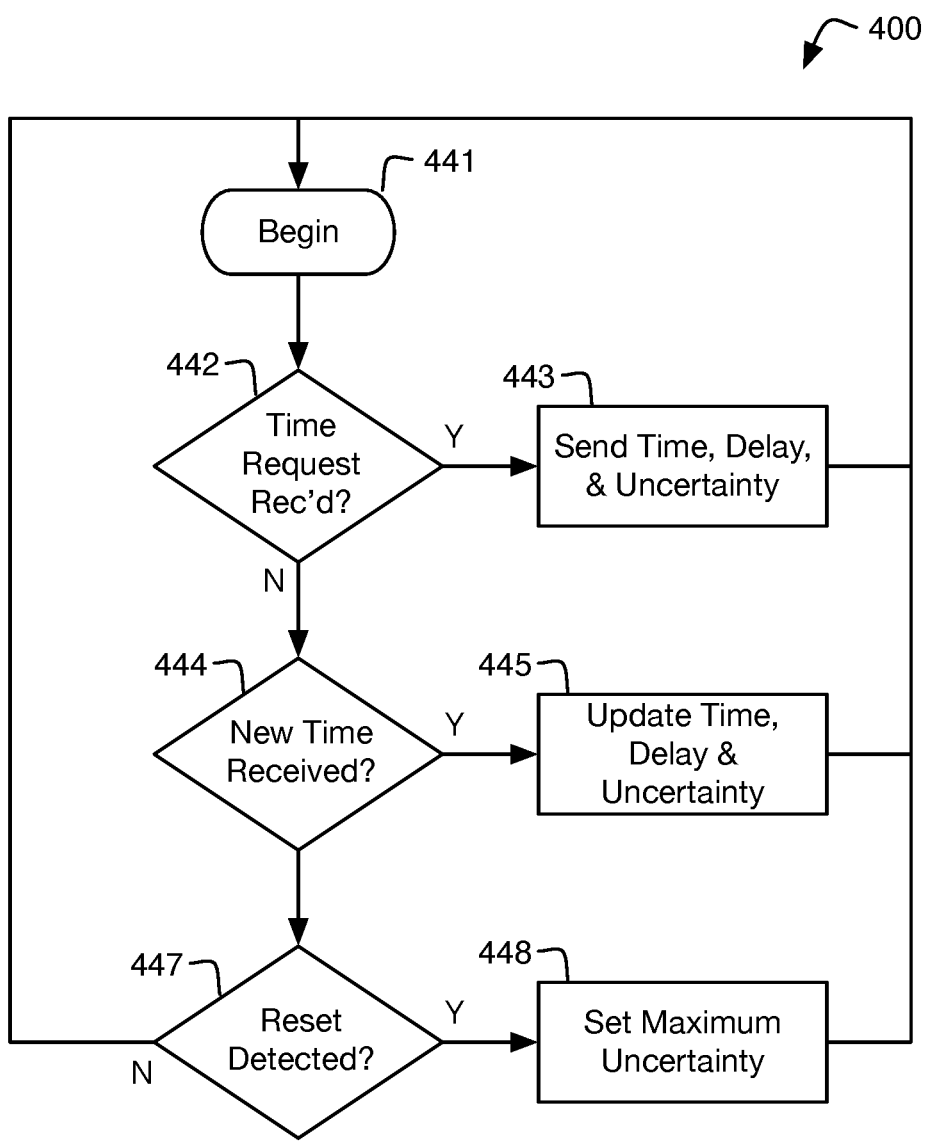
FIG. 4 illustrates a flowchart of a technique that a powered accessory device can use to provide time information to an electronic device and/or update its own internal clock.

FIG. 4 illustrates a flowchart 400 of a technique that a powered accessory device 210 can use to provide time information to an electronic device 220 and/or update its own internal clock. The technique can be performed, for example, by processing system 213 operating in conjunction with other components of powered accessory 210. The technique can begin with block 441. In block 442, powered accessory 210 can determine whether a time request has been received from electronic device 220, e.g., by detecting reception of a Request Accessory Time message 333*a* as discussed above with respect to FIG. 3. If so, in block 443, time, delay, and uncertainty information can be sent to electronic device 220, corresponding to Send Time, Uncertainty message 333*b* discussed above with respect to FIG. 3, and the process can continue, e.g., by returning to beginning block 441.

Otherwise, in block 444, powered accessory 210 can determine whether a new time has been received, e.g., by detecting reception of a Send Updated Time message 337 as described above with respect to FIG. 3. If so, powered accessory 210 can update its real time clock with the current time as well as updating its channel delay and/or time uncertainty estimates based on the received message, and the process can continue, e.g., by returning to beginning block 441.

In block 447, powered accessory 210 can determine whether a reset has been detected. Such a reset might be because of the discharge of the internal energy storage (e.g., battery) of powered accessory or other cause. In any case, such a reset might cause the real time clock of powered accessory 210 to reset, e.g., return to its initial setting/default epoch. In such case, the time provided by powered accessory 210 may be less accurate than an internally recovered time from electronic device 220. It may therefore be desirable to provide an indication that the time provided in such a situation has a large uncertainty associated therewith. Thus, if a reset of powered accessory 210 and/or its real time clock is detected, in block 448, powered accessory 210 can update its uncertainty associated with the time of the real time clock to a value corresponding to a maximum uncertainty. As described in greater detail below, this can inform electronic device 220 that a time received from powered accessory 210 may be unreliable, and electronic device 220 can decide how to proceed as described in greater detail below.

The above-described process is just one example implementation of a process that can be continuously executed by powered accessory 210. Other variations are possible. As one example, the various determinations may be made in different orders. In some applications, the various determination could be performed simultaneously and/or periodically based on differing frequencies of check/update, etc. Unless otherwise expressly noted, any or all such variations could be used in connection with the other teachings and embodiments described herein.

Figure 5:
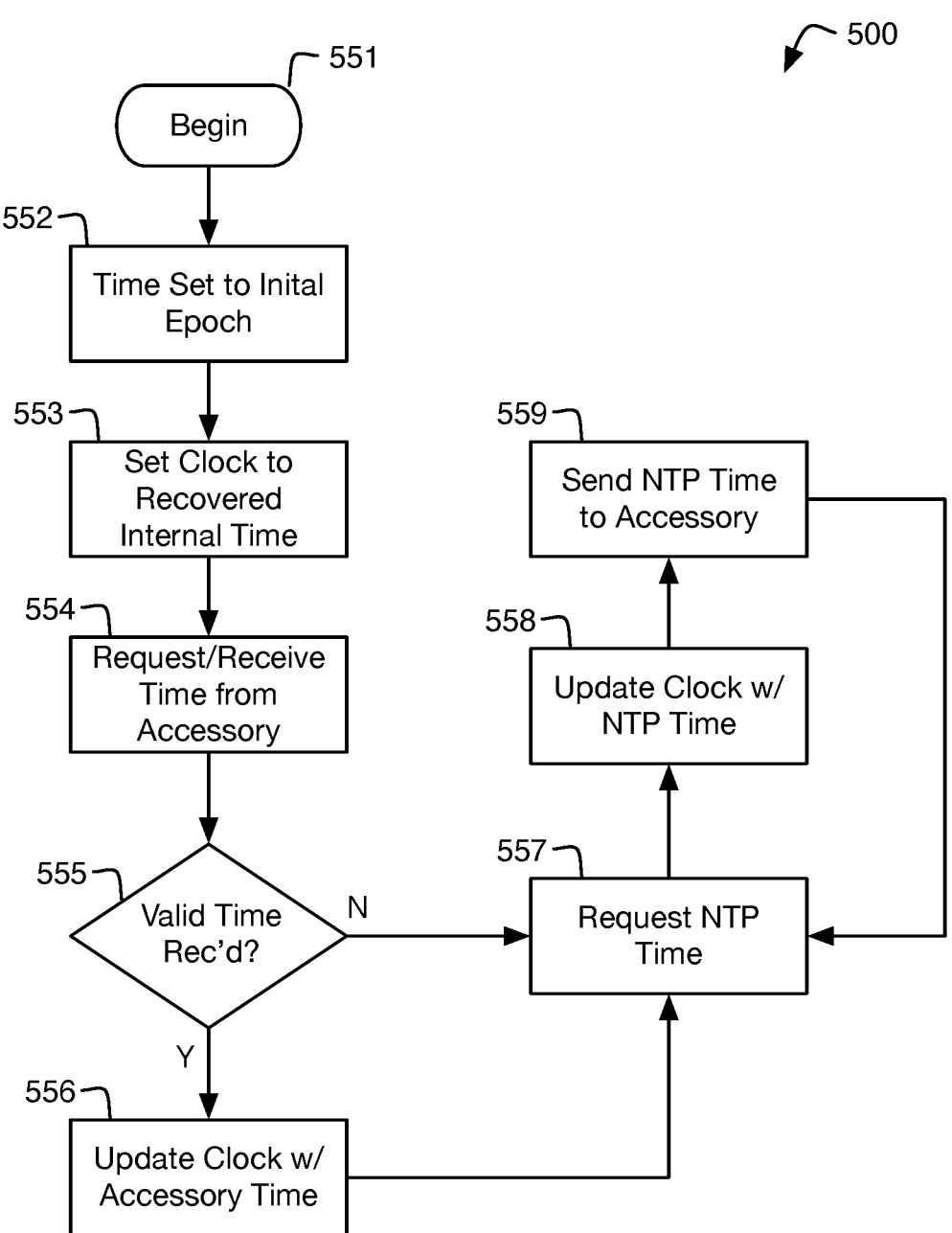
FIG. 5 illustrates a flowchart of a technique that an electronic device can use to derive accurate time information upon reconnection or other restoration of a power source.

FIG. 5 illustrates a flowchart 500 of a technique that an electronic device 220 can use to derive accurate time information upon reconnection or other restoration of a power source. The process begins in block 551 with, for example, a reboot of personal electronic device 220. In block 552, electronic device 220 can set its time to an initial epoch value as described above with respect to block 332 of FIG. 3. In block 553, electronic device 220 can set its internal clock to an internally recovered time, e.g., from filesystem timestamps as also described above with respect to block 332. In block 554, electronic device 220 can request and receive a time update from powered accessory 210. This can correspond to the Request Accessory Time message 333*a* and Send Time, Uncertainty message 333*b* discussed above with respect to FIG. 3. In block 555, electronic device 220 can determine whether the received time is valid, i.e., whether it is sufficiently reliable to serve as a suitable replacement for the recovered internal time derived in block 553. This can include, for example, a comparison or analysis of one or more uncertainty values that is part of the received time packet from the powered accessory. If the received uncertainty value is greater than an existing uncertainty value corresponding to a present setting of electronic device 220's clock and/or if the received uncertainty value exceeds a threshold or other stored comparison index in electronic device 220, then the time may be deemed invalid. Alternatively, if none of these conditions are met, the received time may be considered as valid.

If the received time is determined valid (in block 555), then electronic device 220 can update its internal clock (block 556) with the received accessory time. This operation corresponds to block 336 discussed above with reference to FIG. 3. Flow can proceed to block 557 where an NTP time update may be requested via network from an NTP server (as described above). This corresponds to Request Time Message 335*a* and Send Time message 335*b* discussed above with reference to FIG. 3. Otherwise, if the received time from powered accessory 210 is determined to be invalid, then flow can proceed directly to block 557 without updating the internal clock of electronic device 220. In either case, it may be some period of time between the initial operations described above and when a network time server time update request can be sent. For example, electronic device 220 may not have an available network connection, or such a network connection may not yet be properly set up and configured to allow communication because of the ongoing startup process of the device.

In any case, once a connection to an NTP server can be established, and a suitable response is received, electronic device 220 can update its internal clock with the time received from the NTP server (block 558, corresponding to block 336 of FIG. 3). Additionally, in block 559, electronic device 220 can provide a time update to powered accessory 210, which corresponds to Send Updated Time message 337 discussed above with respect to FIG. 3. Additionally, electronic device 220 can continue to periodically request NTP updates from an NTP server, update its internal clock, and send updated time to the powered accessory while electronic device 220 remains in operation with an available network connection.

The above-described process is just one example implementation of a process that can be continuously executed by electronic device 220. Other variations are possible, including variations in the exact sequencing of events, etc. In some cases, electronic device 220 may continuously and/or periodically request time updates from powered accessory 210 and only provide time updates from the NTP source if the uncertainty associated with the real time clock of powered accessory 210 exceeds a threshold, etc. Unless otherwise expressly noted, any or all such variations could be used in connection with the other teachings and embodiments described herein.

The foregoing describes exemplary embodiments of systems and methods for providing time restoration and resynchronization for an electronic device upon regained availability of a main power source following removal or other unavailability of the main power source for such electronic device. Although numerous specific features and various embodiments have been described, it is to be understood that, unless otherwise noted as being mutually exclusive, the various features and embodiments may be combined in various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A system comprising an electronic device and a powered accessory wherein:

the electronic device comprises:

power regulation circuitry that receives power from the powered accessory;

a first communication system that communicates with the powered accessory;

an internal clock; and a first processing system coupled to the first communication system and the internal clock, wherein upon connection of the electronic device to the powered accessory, the first processing system sends a first time update request to the powered accessory and updates the internal clock based on a first time update received from the powered accessory;

the powered accessory lacks a network connection and comprises:

an energy storage device that delivers power to the electronic device;

a second communication system that communicates with the electronic device;

a real time clock; and a second processing system coupled to the second communication system and the real time clock, wherein upon connection of the electronic device to the powered accessory and receiving the first time update request from the electronic device, the second processing system sends the first time update to the electronic device; and wherein the electronic device further comprises a network interface coupled to the first processing system and the first processing system sends a second time update request to a network time protocol server via the network interface according to a network time protocol and receives a second time update from the network time protocol server via the network interface according to the network time protocol.

2. The system of claim 1 wherein the first time update request takes the form of a network time protocol packet.

3. The system of claim 2 wherein the first time update takes the form of the network time protocol packet.

4. The system of claim 1 wherein:

the first processing system sends a third time update to the powered accessory via the first communication system;

the third time update is based on the second time update received from the network time protocol server; and the second processing system updates the real time clock based on the third time update.

5. An electronic device comprising:

power regulation circuitry that receives power from a powered accessory;

a first communication system that communicates with the powered accessory;

an internal clock; and a first processing system coupled to the first communication system and the internal clock; and a network interface coupled to the first processing system;

wherein upon connection of the electronic device to the powered accessory, the first processing system:

sends a first time update request to the powered accessory and updates the internal clock based on a first time update received from the powered accessory;

sends a second time update request to a network time protocol server via the network interface according to a network time protocol;

receives a second time update from the network time protocol server via the network interface according to the network time protocol; and updates the internal clock based on the second time update.

6. The electronic device of claim 5 wherein the first time update request and first time update take the form of a network time protocol packet.

7. The electronic device of claim 6 wherein the first time update request and first time update do not correspond to a network time protocol.

8. The electronic device of claim 5 wherein the first time update includes information about present time, communication delay between the electronic device and the powered accessory, and a powered accessory clock uncertainty value.

9. The electronic device of claim 8 wherein the first processing system does not update the internal clock if the powered accessory clock uncertainty value exceeds a threshold.

10. The electronic device of claim 5 wherein prior to sending the first time update request to the powered accessory, the first processing system updates the internal clock using an internally recovered time.

11. The electronic device of claim 10 wherein the internally recovered time is based on a file system timestamp associated with the first processing system.

12. The electronic device of claim 5 wherein the first processing system sends a third time update to the powered accessory via the first communication system, and the third time update is based on the second time update received from the network time protocol server.

13. A powered accessory that supplies power an electronic device and lacks a network connection, the powered accessory comprising:

an energy storage device that delivers power to the electronic device;

a communication system that communicates with the electronic device;

a real time clock; and a processing system coupled to the communication system and the real time clock;

wherein upon connection of the electronic device to the powered accessory and receiving a first time update request from the electronic device, the processing system:

sends a first time update to the electronic device;

receives a second time update via the communication system from the electronic device; and updates the real time clock based on the second time update.

14. The powered accessory of claim 13 wherein the first time update request and first time update take the form of a network time protocol packet.

15. The powered accessory of claim 14 wherein the first time update request and first time update do not correspond to a network time protocol.

16. The powered accessory of claim 13 wherein the first time update includes information about present time, communication delay between the electronic device and the powered accessory, and a powered accessory real time clock uncertainty value.

17. The powered accessory of claim 13 wherein the processing system detects a reset that might affect the real time clock and in response thereto sets an uncertainty value associated with the real time clock to a maximum value.

* * * * *